United States Patent

[11] 3,602,518

[72] Inventor George French
Rue de la Republique-Flers, France
[21] Appl. No. 826,538
[22] Filed May 21, 1969
[45] Patented Aug. 31, 1971
[73] Assignee U.S. Philips Corporation
New York, N.Y.

[54] SPRING SPINDLE
1 Claim, 2 Drawing Figs.

[52] U.S. Cl. .......... 274/10 S
[51] Int. Cl. .......... G11b 17/04
[50] Field of Search .......... 274/10 S, 10

[56] References Cited
UNITED STATES PATENTS
2,628,843 2/1953 Comstock .......... 274/10
FOREIGN PATENTS
68,662 12/1944 Norway .......... 274/10

*Primary Examiner*—Leonard Forman
*Assistant Examiner*—Steven L. Stephan
*Attorney*—Frank R. Trifari

ABSTRACT: A spindle for use on a record changer having a shaft with a longitudinal groove accommodating a lever, one end of which is extended for supporting a pile of records and the other end of which cooperates with a changing control means to retract the extended end of the lever. A device for applying pressure to the top of the pile of records is attached to the upper end of the lever and has a plurality of legs pivotally extending therefrom for bearing on the top of the pile of records. A compression spring exerts a force on the legs to maintain them in a spaced apart condition so as to prevent dropping of the records until the spring force is removed from the legs.

INVENTOR.
GEORGE FRENCH
BY
AGENT

SPRING SPINDLE

The invention relates to a spindle for changing records of the kind having a small central hole.

Changing spindles for records having a hole of small diameter are known for use on automatic record changers. A known mechanical device actuates a lever forming part of the spindle, which forms the shaft proper of the turntable. This spindle has a longitudinal slot accommodating a lever the lower end of which extends beyond the shank of the spindle and the upper end of which is provided with a semicircular member adapted to disappear in the body of the spindle and to project the platform to support the records. This lever is prolonged upwardly by a cylindrical portion on which the records are stacked. A recess approximately corresponding to the thickness of a record is provided above the location of the supporting member. In the rest position the record supporting part of the lever is in a salient position and holds the records. When the end of the lever is actuated by the change-control the supporting part disappears and the record located opposite the recess slides into the playing position. THe position of the supporting spindle prevents a second record from sliding down during playing. In order to avoid an excessive disequilibrium of the assembly and in order to arrange a new record in the waiting position it is necessary to use a pushing member formed by an appropriate system bearing on the upper record of the pile. This pushing member is otherwise fixed to the table supporting the pickup arm and the turntable. This assembly is bulky and unaesthetical. The object of the present invention is to eliminate this pushing member and to replace it by a device forming part of the spindle of the turntable.

According to the invention the object is achieved by providing a spindle for changing records having a small diameter hole, which has a shaft provided with a longitudinal groove accommodating a lever, one end of which may occupy a salient position for supporting a pile of records and the other end of which can cooperate with changing means of a record changer controlling the retraction of the salient portion. A device for applying pressure to the top of the pile of records is attached to the upper end of the lever. The device has a mechanical member with movable parts for bearing on the top record and is held in an active position by the direct or indirect action of a spring. Preferably the movable parts are adapted to be retracted into the mechanical member supporting the same, when the action of said spring is nullified.

Figure 1:
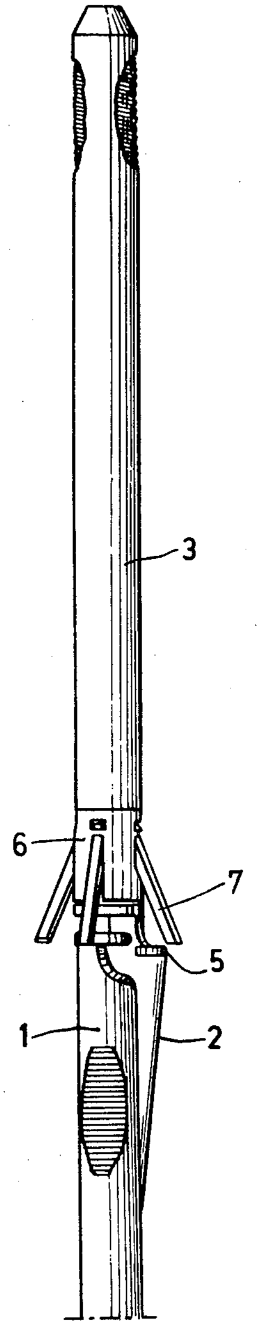
Figure 2:
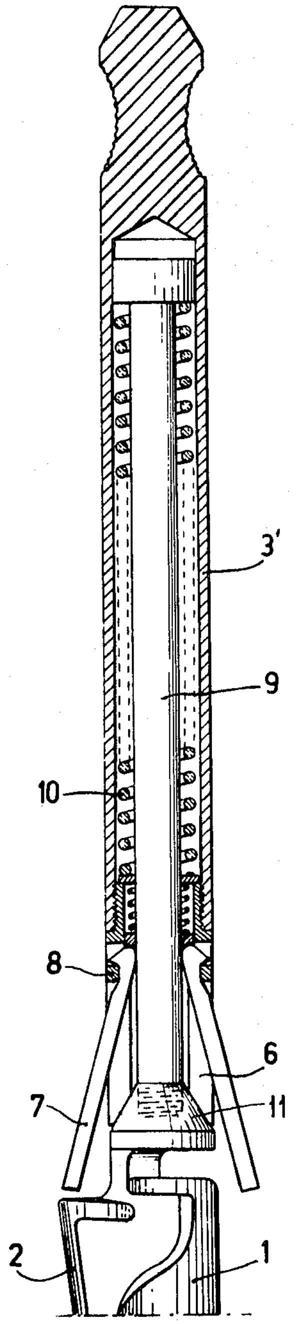

The invention by way of example will now be described more fully with reference to the accompanying drawings, in which FIG. 1 shows the record changing spindle in mounted position; and FIG. 2 is a sectional view of said spindle.

A lever 2 (FIG. 1), is adapted to be retracted in a cavity provided in a shaft 1. A device 3 in accordance with the invention for prolonging or extending lever 2 is attached to the top of lever 2. Tongues 4 provided in the lower part of the device 3 can bear on the records held by a supporting portion 5 of the lever 2.

FIG. 2 illustrates the operation of he device.

THe upper portion of the lever 2 of a changing spindle for records having a central aperture of small diameter of known kind is shortened and provided with screw thread at its center. The device 3 is screwed into the screw thread on the upper portion of the lever 2.

The cylindrical tube 3' (FIG. 2), one end of which is closed, is screwed onto a cylindrical member 6 having four longitudinal milled openings accommodating four legs 7 having one end formed by a hook pivotally arranged on axes provided in the milled grooves. A pin 9, having at one end a cylindrical portion of larger diameter and screwed by the other end into the upper conical portion 11 of the lever, holds a compression spring 10 between its end and the metal legs 7. This spring bears in a downward direction on the ends of the hooks through a simple member to exert a downward force on them and tends to hold the legs spaced apart. As FIG. 2 illustrates, legs 7 are held in the spaced-apart manner by their hook portions pivoting about members 8. This is accomplished by the downward force exerted on the hook portion by the spring.

The device operates as follows:

The desired records are piled on the tube 3'. The pile of records cannot pass beyond the end for getting into the position for change because the pushing legs 7 are spaced apart. In order to clear the passage so as to allow a record to pass the legs have to be caused to enter the recesses provided in the supporting member 6, for which purpose a force is exerted on the end of the spindle. To accomplish this, tube 3' is lifted, after a pile of records is placed thereon, in order to eliminate the action of spring 10 on the legs. When this is done, the legs 7 will fall into a retracted position and the pile of records will move down to a position in which the lowermost record rests on shoulder 5. When the pile of records is in the correct position, the pressure of the spring 10 exerted on the hook portions of legs 7 is restored by releasing the tube 3' so that the legs assume a spaced-apart position. By holding the legs spaced apart and by putting them into contact with the last record of the pile.the spring provides for correct operation of the spindle.

An advantageous detail consists in providing a pushing tongue opposite the supporting member in order to prevent the last record from falling into playing position along with the record which has been dropped to the playing position.

A record is lowered into the playing position on a turntable in known manner.

This device has numerous advantages, the most important of which are:

An existing change spindle may be modified in a very simple manner.

The records are uniformly subjected to pressure and any wrong position is excluded.

The device may furthermore be employed for the distribution of any piece of comparatively small thickness having an aperture of a diameter corresponding with the diameter of the spindle. The device is furthermore capable of distributing pieces or objects of any shape arranged on a platform of appropriate shape and diameter.

I claim:

1. A spindle for use in a record player for supporting a plurality of records to be supplied to the playing position comprising, a shaft for attachment to the player, a lever movably mounted within a longitudinally extending cavity on said shaft the upper end of which occupies an extended position for supporting thereon the plurality of records and the other end of which is arranged for cooperation with a record changer control means for causing retraction of the extended portion of said lever to permit a record to be moved to the playing position, a device attached to the upper end of said lever for applying pressure to the top of the pile of records, said device comprising a cylindrical member having a plurality of longitudinally extending slots, a leg pivotally mounted within each of said slots for extending beyond the surface of said cylinder and engaging the upper record for applying pressure thereto, a cylindrical housing mounted above said cylindrical member, and spring means within said housing for exerting a force on said legs to maintain said legs in a spaced apart condition, said legs being allowed to fall into a retracted position when a force is exerted on the spindle to remove the spring force from said legs thereby allowing a record to pass to the playing position.